United States Patent
Ogasawara

[11] Patent Number: 5,862,417
[45] Date of Patent: Jan. 19, 1999

[54] AUTOMATIC FOCUS ADJUSTMENT APPARATUS

[75] Inventor: Akira Ogasawara, Tokyo, Japan

[73] Assignee: Nikon Corporation, Tokyo, Japan

[21] Appl. No.: 943,203

[22] Filed: Oct. 3, 1997

Related U.S. Application Data

[63] Continuation of Ser. No. 704,245, Aug. 28, 1996, abandoned.

[30] Foreign Application Priority Data

Aug. 31, 1995 [JP] Japan .................................. 7-223946

[51] Int. Cl.$^6$ .................................................. G03B 13/36
[52] U.S. Cl. ............................................................ 396/95
[58] Field of Search ...................................... 396/95

[56] References Cited

U.S. PATENT DOCUMENTS

| | | | |
|---|---|---|---|
| 5,502,537 | 3/1996 | Utagawa | 396/95 |
| 5,587,762 | 12/1996 | Watanabe | 396/95 |

FOREIGN PATENT DOCUMENTS

| | | |
|---|---|---|
| 58-142306 | 8/1983 | Japan . |
| 59-107313 | 6/1984 | Japan . |
| 1-107224 | 4/1989 | Japan . |
| 2-256677 | 10/1990 | Japan . |
| 3-80235 | 4/1991 | Japan . |
| 4-133016 | 5/1992 | Japan . |
| 5-2127 | 1/1993 | Japan . |

OTHER PUBLICATIONS

Abstract of JP–A–63–31733, Feb. 1994, Japan.
Abstract of JP–A–1–288815, Nov. 1989, Japan.

*Primary Examiner*—W. B. Perkey
*Attorney, Agent, or Firm*—Oliff & Berridge, PLC

[57] ABSTRACT

An automatic focus adjustment apparatus more ideally accomplishes a tracking servo process, which drives a shooting lens so that a focusing state is maintained by predicting movements of an image plane of a moving object. A lens driving system 6 determines the moving speed of an image plane of an object or a movement prediction curve by regression-calculating from a plurality of defocus amounts previously calculated, a calculator, the accumulation time of a focusing state detector, and a lens position obtained from a lens movement amount detector, to drive a lens by assuming a future position of the image plane based on a result of the calculation.

8 Claims, 9 Drawing Sheets

AUTOMATIC FOCUS ADJUSTMENT APPARATUS

This is a continuation of application Ser. No. 08/704,245 filed Aug. 28, 1996 now abandoned.

BACKGROUND OF THE INVENTION

1. Field of the Invention

The invention is directed to an automatic focus adjustment apparatus for use in cameras and other optical devices. In particular, the invention is directed to a predictive focusing-type automatic focus adjustment apparatus that can detect and predict an object's movement to drive a shooting lens. The object's movement is predicted so as to maintain a focused state.

2. Description of Related Art

In single reflex cameras having an automatic focus adjustment function, also known as an auto-focus function, different kinds of predictive focusing methods or "tracking servo" methods have been proposed. These auto-focus functions detect that an object is moving, determine a defocus amount based on the object's movement, and then drive a shooting lens based on the determined defocus amount to maintain a focused state. For example, Japanese Laid-Open Patent Application Nos. 4-133016, 5-2127, 5-80235 and 1-107224 disclose such auto-focus functions.

Generally, the detection of a defocus amount is determined through a series of processes summarized as follows. A part of a beam of luminous flux is first transmitted through a shooting lens, and is then directed onto a charge accumulating type sensor (AF sensor), such as a CCD, in a focus detecting optical system. A charge corresponding to an illuminent distribution of an image is read after it is accumulated for an appropriate time period. The charge is then input to a microcomputer or CPU by being converted to digital data by an A/D converter. The CPU determines the focusing state by a predetermined algorithm. Then, a defocus amount is calculated as a relative distance between a film's surface and an image plane for the object.

Methods for calculating a defocus amount are known in Japanese Laid-Open Patent Application Nos. 58-142306 and 59-107313. In these publications, a defocus amount is determined as discrete data, which may be intermittently and periodically detected. The periods should preferably be at least 30 ms, because an accumulation time for an AF sensor generally requires, for example, 10 μs to 100 ms, based on the illuminance of the object and because approximately 10 ms is used for the algorithm's calculation time. Therefore, calculating a moving speed of the image plane of the object from an intermittently detected defocus amount is an important aspect of the tracking servo method.

The inventor has developed an overlap servo-type automatic focus adjustment apparatus, which accumulates a charge in an AF sensor, and simultaneously drives a shooting lens as disclosed in Japanese Laid-Open Patent Application No. 4-133016 (JP016). A graph representing a method for calculating a image plane moving speed of an object according to JP016 is illustrated in FIG. 12.

FIG. 12 illustrates a graph depiction for detecting an image plane moving speed image plane of an object. In FIG. 12, horizontal axis t represents time, and vertical axis z represents distances on an optical axis. Line Q represents focusing positions proximate a film's surface. As the object moves, the focusing positions follow the object's movement in timed coordination with the object. Line L represents an actual image plane position of the shooting lens. Therefore, the difference between lines Q and L is a defocus size D. Defocus size D is directly measured.

Points, such as t(n), t(n−1), . . . , on the horizontal axis are midpoints of each accumulation time for the AF sensor. The accumulation time is a period of time represented between two vertical lines drawn to lines Q and L. (The vertical axis, horizontal axis, line Q and line L have the same meaning in other drawings in this disclosure.) The defocus amount at, for example, times t(n−1) and t(n) are D(n−1) and D(n), respectively, and further, the accumulation time for the AF sensor is t(n).

In FIG. 12, when defocus amount D(n) is obtained from a measurement at time t(n), a previous defocus amount D(n−1) is obtained at time t(n−1), and the moving amount or distance M(n) of the shooting lens is obtained between times t(n) and t(n−1). Therefore, a movement amount P(n) of the image forming plane for the object from time t(n−1) to time t(n) is calculated according to Equation (1):

$$P(n)=D(n)+M(n)-D(n-1) \tag{1}$$

The moving speed S(n) of the image plane for the object is calculated according to Equation (2):

$$S(n)=P(n)/\{t(n-1)-t(n)\} \tag{2}$$

Defocus amount D is measured as a unit of distance along the optical axis. The movement amount of the shooting lens can be detected as an output pulse number of an encoder, which detects a rotation of a lens driving motor. The speed of the image plane for an object is obtained as a moving distance along the optical axis per unit time, and is accomplished by multiplying a proportional constant, which is determined from a shooting magnification of the shooting lens, by an output pulse number for the encoder. If the speed of the image plane for the object is obtained as an encoder pulse number per unit time, the defocus amount will be converted to a pulse.

However, errors can be caused by factors such as noise from the AF sensor signals or setting a depth for the distance or range measuring area for the object. These factors are included in an intermittently measured defocus amount. Since differences between two defocus amounts are calculated to determine a speed of an image plane for an object (Equation (1), errors in distance measurement greatly affect the defocus amount. In particular, if two defocus measuring times t(n) and t(n−1) are adjacent, computation results for the speed of an object image plane will be inaccurate and unstable due to these consecutive errors.

To overcome this problem, JP016 proposes determining an image plane from a defocus amount determined by two non-adjacent time periods. The defocus amount, according to JP016, uses a time period prior to the present period. Thus, a new defocus amount is determined as described with reference to FIG. 13.

FIG. 13 is a graph describing a principle to detect an image plane speed for an object from a defocus amount D(n−2), which is two time periods before the instant period t(n) and the most instant focus amount D(n). In FIG. 13, the amount of movement P(n) of the object image forming plane is defined by Equation (3):

$$P(n)=D(n)+M2(n)-D(n-2) \tag{3}$$

In Equation (3), M2(n) represents a distance that the shooting lens moves from time t(n−2) to time t(n).

From Equation (3), the moving speed S(n) of the image plane for the object is defined according to Equation (4):

$$S(n)=P(n)/\{t(n)-t(n-2)\} \quad (4)$$

If the movement amount for the image forming plane is determined using a defocus amount and distance measurement time from prior time periods, the movement amount is relatively greater than compared to adjacent defocus amounts. This increases the accuracy of the measurements.

However, since responsiveness is decreased as an object speed varies over time, the method for determination should be selected depending on a size of the movement amount for the image forming plane and how many generations before the instant or present time were used to calculate the lens speed. In other words, when the speed of the image forming plane is fast, it is not necessary to use data from such prior time periods. However, when the speed of the image forming plane is relatively slow, it is useful to use data from prior time periods.

A time period of approximately 300 ms is useful for a responsive determination of a defocus amount. The possible number of times to measure a defocus amount during this time is dependent on several factors, including the object's illuminance and the calculation speed of the CPU. Therefore, appropriate measurement data should be selected from prior measurement data for this time range.

Japanese Laid-Open Patent Application No. 3-80235 (JP235) proposes to determine a linear regression diagram or curve, using backup data, including defocus amounts, and a measurement time up to when a release of the shutter is started. However, in JP235 an object is assumed to be stationary. In other words, JP235 assumes that a focusing position is fixed. Thus, a linear regression diagram or curve is calculated to predict time changes in response to a repeatedly measured defocus amount during the lens drive to focus a stationary object using the overlap servo. This predictive diagram or curve is constructed according to Equation (5):

$$y=a+bt \quad (5)$$

If the defocus amount and accumulation time for the AF sensor are expressed as D(k) and t(k), respectively, the parameters a and b can be expressed according to Equations (6) and (7):

$$b=\{\Sigma t(k)-\Sigma t(k)\cdot D(k)/n\}/\{\Sigma t(k)^2-\Sigma t(k)^2/n\} \quad (6)$$

$$a=\{\Sigma D(k)-b\Sigma t(k)\}/n \quad (7)$$

where $\Sigma$ sums the variables for k=1 to n.

FIG. 14 is a graph illustrating a principle for determining a linear regression diagram or curve. If a time period is determined according to Equation (5), the determined time becomes the most suitable time for exposing on a film. JP235 proposes that exposure is commenced at this time.

Japanese Laid-Open Patent Application No. 1-107224 (JP224) proposes to predict the movement locus for an image forming plane with a diagram or curve, such as a quadratic function rather than a linear function.

FIG. 15 is a graph illustrating a principle where a movement locus for the image forming plane is predicted according to JP224. The lens drive and calculation of the AF sensor accumulation for the defocus amount do not sequentially overlap in JP224. If DF 1 is a defocus amount at a previous time; DF 2 is a defocus amount immediately after the previous time; DF 3 is a defocus amount of the instant time; DL 1 is a lens drive amount between the previous time at DF 2 and one before the previous time at DF 1; and DL 2 is a lens drive amount between the instant time at DF 3 and the previous time at DF 2 ; the image plane can be expressed according to the quadratic equation (8):

$$x=at^2+bt+c \quad (8)$$

where the parameters a, b, and c are determined according to Equations (9)–(11):

$$a=\{(DF3+DL2-DF2)/(TM1+TM2)TM2\}+\{(DF1-DL1-DF2)/(TM1+TM2)TM1\} \quad (9)$$

$$b=(DF2+DL1-DF1-a\cdot TM1^2)/TM1 \quad (10)$$

$$c=DF1 \quad (11)$$

In JP224, during a normal auto focus lens drive, i.e., before a release sequence, a target for the lens drive is determined immediately after each defocusing amount has been detected. After a total time including a specified time that is applied for lens drive, and a delayed time that is known as a release time lag up to the film exposure in the release sequence, has elapsed, a focusing position for lens drive can be calculated according to Equation (8). In other words, by forcefully synchronizing a start of a release sequence immediately after completion of each lens drive and movement, the lens drive is controlled so the lens is positioned at the focusing position at the film exposure time. Therefore, the start of a release sequence will only be accepted when each lens drive has been completed. FIG. 15 graphically illustrates the above method.

Differences in measurement data, from prior time periods, are used to increase accuracy in the detection of an image plane speed, as explained in Japanese Laid-Open Patent Application No. 2-256677 (JP677). However, in JP677 some data that has been factored out, is not considered in the calculation. Thus, all useful information is not fully considered.

A method to determine a linear regression diagram or curve is disclosed in Japanese Laid-Open Patent Application No. 3-80235 (JP235). JP235 is considered to be accurate in that it considers information normally factored out, for example, in JP677. However, only stationary objects are disclosed in JP235, and JP235 is only used to obtain a most appropriate exposure timing, after the start of a release sequence. Additionally, JP235 assumes that a driving speed of the shooting lens has a constant speed, and that times for distance measurement are always equal, thus resulting in poor reliability.

JP235 does not disclose basic concepts for predicting an image plane position using regression diagrams or curves for the tracking servo method before entering into a release sequence. Thus, JP235 is not effectively used for a lens drive with a moving object.

Japanese Laid-Open Patent Application No. 1-107224 (JP224), considers a point from which the image plane predicts a diagram or curve, the quadratic function of Equation (8), as the actual motion of the image plane. The image plane is not considered linear but quadratic. Therefore, predicting a focusing position may be more accurately determined using Equation (8) than by using the linear function of Equation (5), where the AF sensor accumulation and lens drive do not overlap. Further, the lens driving time, when the defocus amount is detected, is constant, regardless of the lens drive amount. The lens drive is completed within this driving time. Alternatively, the driving time is limited to a time that a normal lens drive could be completed.

Therefore, with JP224, a subsequent accumulation of the AF sensor is always delayed for a length of time to drive a lens. Furthermore, the number of times to detect the defocus amount per unit time is smaller than compared to a time where accumulation of the AF sensor and lens drive overlap.

SUMMARY OF THE INVENTION

The invention is directed to overcome the above-noted and other deficiencies in conventional auto focus devices. Accordingly, it is an object of embodiments of the invention to provide an automatic focus adjustment apparatus, where accumulation of an AF sensor and a lens drive overlap so as to increase the number of defocus detecting times. When the image plane is detected to be moving, and thus entering a tracking servo auto focus, a regression diagram or curve will be calculated to predict as many moving functions of the image plane as possible from auto focus backup data in a range where the responsiveness is not affected. Thus, an efficient and reliable tracking servo auto focus becomes possible.

As described above, by overlapping the accumulation of a charge accumulating type sensor and lens drive, the number of times for detecting defocus amounts per unit time can be increased. Moreover, the responsiveness is not affected because defocus amounts are stored, and a regression diagram or curve can be calculated to predict a movement function of the image plane from as much backup data as possible over a range. This is done when the lens drive enters a tracking servo process by detecting that the image plane is moving, the tracking servo process can be created effectively and utilized.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The invention will be described in detail with reference to the following drawings, in which like reference numerals refer to like elements and wherein.

DETAILED DESCRIPTION OF PREFERRED EMBODIMENTS

Figure 1:
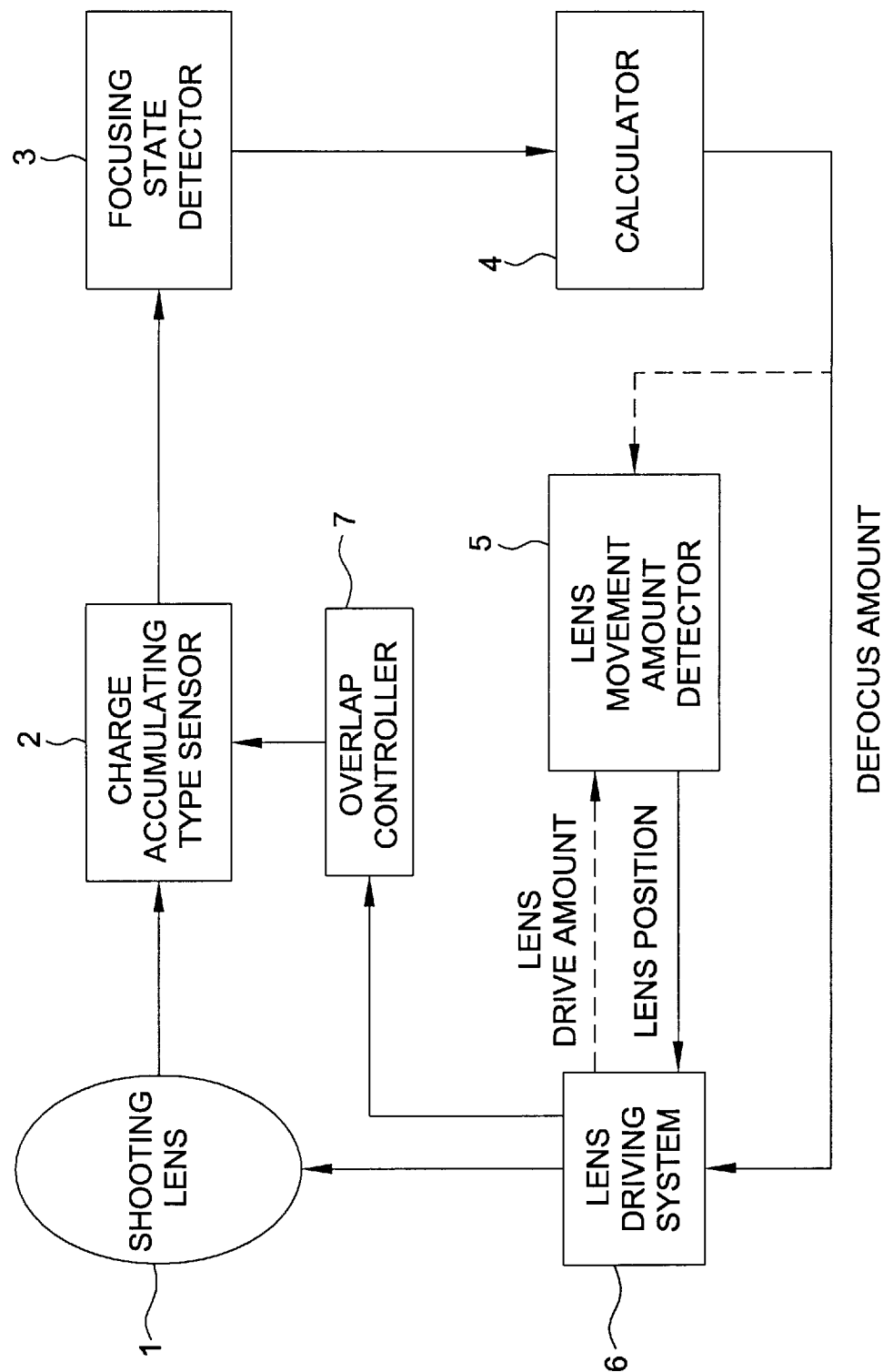
FIG. 1 is a schematic block diagram or curve illustrating a first embodiment according to the invention.

FIG. 1 is a schematic block diagram of a first preferred embodiment of the invention. In FIG. 1, an automatic focus adjustment apparatus includes a focusing state detector 3 that detects a focusing state of a shooting lens 1 using a charge accumulating type sensor 2, where the detected defocus amounts include an amount and a direction for displacements up to a focusing position. A calculator 4 processes focusing state data output by detector 3. A lens movement amount detector 5 successively detects relative positions of shooting lens 1 and actual amounts of movement based on the defocus amounts calculated by the calculator 4, or alternatively, based on a lens drive amount provided by a lens driving system 6. The lens driving system 6 drives the shooting lens 1 to a focusing position based on defocus amounts calculated by the calculator 4, in accordance with a detected movement amount detected from the lens movement amount detector 5.

The lens driving system 6 determines a moving speed for an image plane of an object. Alternatively, the driving system 6 can determine a movement prediction diagram or curve using a regression calculation based on a plurality of the defocus amounts. The plurality of defocus amounts are calculated by the calculator 4 using an accumulation time from the focusing state detector 3 and a lens position obtained from the lens movement amount detector 5. This is used to drive the lens to a future predicted position of the image plane.

The automatic focus adjustment apparatus further comprises an overlap controller 7 that overlaps a lens drive time and an accumulation time. The overlap controller 7 also controls the accumulating of charges on the charge accumulating type sensor 2 while driving the shooting lens via the lens driving system 6.

The lens driving system 6 can rely on data, which may dynamically vary, detected over a specified time for the regression calculation. Further, the lens driving system 6 can determine a movement prediction diagram or curve for the image plane by detecting image plane acceleration. The image plane acceleration is determined from change amounts of the image plane speed determined by each regression calculation. In turn, this can be used to predict a future position of the image plane.

A movement prediction diagram or curve determined by the lens driving system 6 for the image plane passes through a midpoint or center of data used for the regression calculation and a predicted point of the image plane at the next accumulation time. The lens driving system 6 can also determine a movement prediction diagram or curve for the image plane so that the diagram or curve passes through a midpoint or center of data used for the regression calculation and a predicted point of the image plane for a time after the next accumulation time. This diagram or curve is used as a basis for driving the lens after a subsequent accumulation is finished.

The lens driving system 6 may also determine a movement prediction diagram or curve for the image plane so the diagram or curve passes through a position of the image plane for a most recent accumulation time and a predicted point of the image plane at a subsequent accumulation time.

The lens driving system 6 may thus use this diagram or curve to drive the lens after the subsequent accumulation time.

The lens driving system 6 can also correct a movement prediction diagram, so the diagram or curve passes through an image plane position at a most recent accumulation time and a predicted point of the image plane for the subsequent time after the next accumulation time. The lens driving system 6 uses this diagram or curve to drive the lens after the next accumulation time.

The lens driving system 6 can further drive the lens based on a corrected movement prediction diagram or curve until a specified time has elapsed. The lens driving system 6 can drive the lens according to this diagram or curve even after starting film exposure.

Next, an operation of the automatic focus adjustment apparatus according to the present invention is described.

The lens driving system 6 determines a moving speed of the image of the object or a movement prediction diagram or curve by a regression-calculation from data for a plurality of defocus amounts. The defocus amounts are previously calculated and determined by the calculator 4. The lens driving system 6 also relies on accumulation times determined by the focusing state detector 3 and lens positions obtained from the movement amount detector 5 to make its determination. Based on this determination, future image positions can be predicted or estimated to drive the lens.

Therefore, the lens driving system 6 relies on a predicted focusing position for a regression calculation using past distance measurement data, i.e., defocus amounts and sensor accumulation times over a range where responsiveness of the determination is not adversely affected. Thus, a shooting lens to be focused on a predicted image plane position can always be appropriately driven and a focused image can be maintained.

Figure 2:
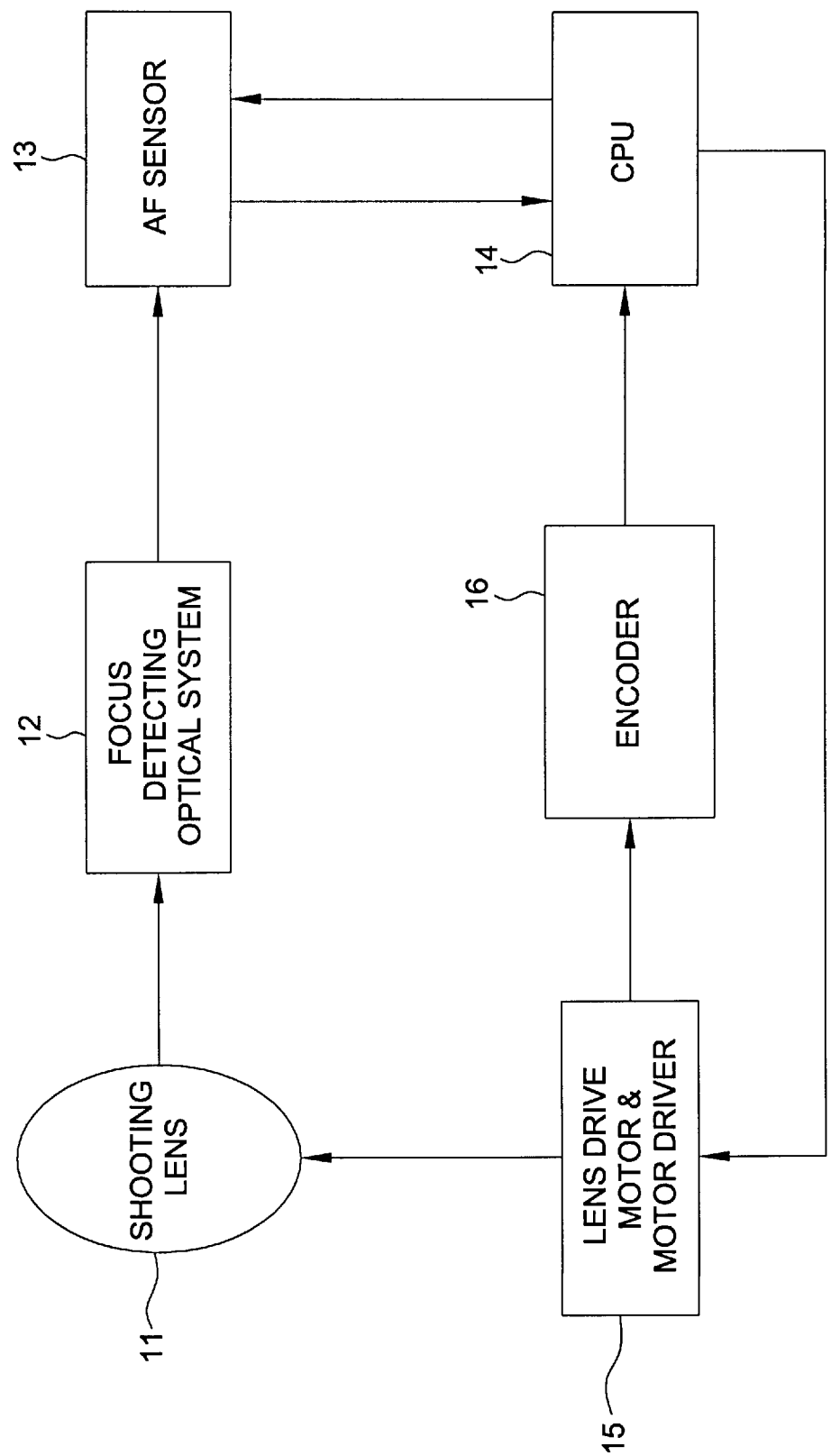
FIG. 2 is a schematic block diagram of an automatic focus adjustment apparatus according to a second embodiment of the invention.

FIG. 2 is a schematic block diagram of an automatic focus adjustment apparatus according to second embodiment of the invention. In FIG. 2, the automatic focus adjustment apparatus includes a shooting lens 11, a focus detecting optical system 12, a charge accumulating type sensor, for example, an AF sensor 13, a microcomputer or CPU 14, a lens drive motor and motor driver 15, and an encoder 16.

In FIG. 2, a beam or luminous flux is transmitted through the shooting lens 11 and is directed onto the AF sensor 13 by the focus detecting optical system 12. Electric charges, corresponding to the illuminance distribution of an object's image, are accumulated in the AF sensor 13. The accumulated electric charges are read over appropriate time periods, and converted to digital data by an A/D converter (not illustrated). The digital data is then sent to CPU 14.

The CPU 14 determines a focusing state by applying a specified algorithm to the image data. The CPU 14 calculates and detects a defocus amount, which is a relative distance from a film's surface to an image plane for an object. Based on the determined result, lens drive motor and motor driver 15 are controlled to move for the shooting lens 11 to the focusing position.

As is apparent from the above descriptions, in the embodiments of this invention, the control system can be implemented as a single special purpose integrated circuit (e.g., ASIC) having a main or central processor section for overall, system-level control, and separate sections dedicated to performing various different specification computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The control system can also be implemented using a suitably programmed general purpose computer, e.g., a microprocessor, microcontroller or other processor device (CPU or MPU), either alone or in conjunction with one or more peripheral (e.g., integrated circuit) data and signal processing devices.

The encoder 16 detects a rotational number for the lens drive motor in the lens drive motor and motor driver 15. (That is, encoder 16 outputs pulses based on the amount of movement of the lens 11.) A pulse, which is indicative of a lens drive amount is provided to the CPU 14. The CPU 14 then can determine a driving position of the shooting lens 11 from the defocus amount and/or the pulse number.

Additionally, the CPU 14 enables operations to determine an image plane moving speed for an object. Alternatively, the CPU can determine a movement prediction diagram or curve by calculating a regression from a plurality of previously determined defocus amounts, accumulation times of the focusing state from the AF sensor 13, and a lens position of the shooting lens 11. The movement prediction diagram or curve is used to predict or estimate a future position of the image plane. This prediction is used to control and to drive the shooting lens 11 using the lens drive motor and motor driver 15. Further, the CPU 14 enables operations to overlap charge accumulations of the AF sensor 13, while driving the shooting lens 11.

The shooting lens 11 and the AF sensor 13 of the second preferred embodiment correspond to the shooting lens 1 and the charge accumulating type sensor 2 of the first preferred embodiment, respectively. Further, CPU 14 corresponds to focusing state detector 3, the calculator 4 and the overlap controller 7. The CPU 14 and the lens drive motor and motor driver 15 correspond to the lens driving system 6. The CPU 14 and the encoder 16, or the CPU 14 alone, correspond to the lens movement amount detector 5.

Operations for the preferred embodiments of the invention are described with reference to FIGS. 3–11. First, a method to calculate a linear regression diagram, which predicts movement of the image plane from a plurality of measurement data with an overlap servo operation, is explained.

Figure 3:
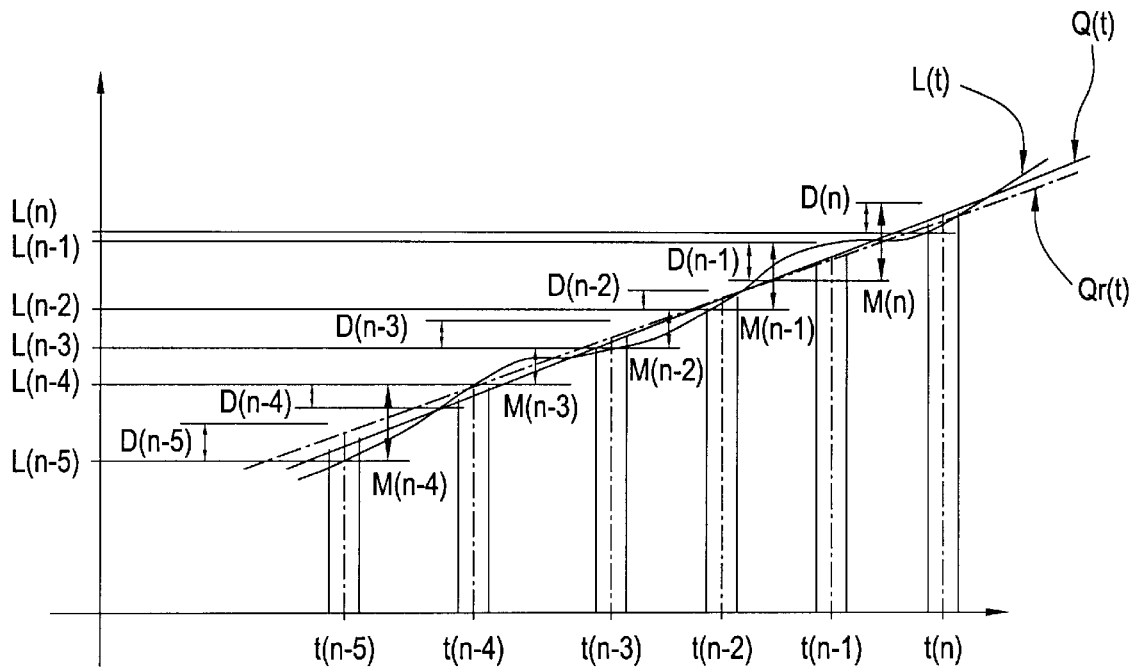
FIG. 3 is a graph representing a measured defocus amount D(n) during an overlap servo process, accumulation time t(n) of an AF sensor, and an amount M(n) of a movement of a lens during the accumulation time.

FIG. 3 is a graph of measured defocus amounts $D(n)$ during the overlap servo operation, the AF sensor accumulating time $t(n)$, and the lens movement amount $M(n)$ during the accumulating time.

A defocus amount $D(n)$ is preferably detected as a difference between a focusing position $Q(t)$ next to the film surface and an actual image plane position L. However, because measurement errors occur, the focusing position that is determined from the detected defocus amount $D(n)$ is slightly different from that at $Q(t)$. As a result, a focusing position is set at a position indicated by a point during each accumulation time. Therefore, a prediction of an exact focusing position $Q(t)$ is needed.

The defocus amount $D(n)$ is a dimension along the optical axis. The position of the shooting lens 1 or 11 is represented as a cumulative amount of output pulses from an encoder used to detect a rotational amount of the lens drive motor. Even though the image plane and position of the shooting lens do not always move in unison or in parallel, because a cumulative ratio is input as variable data for each shooting lens time, the lens movement amount $M(n)$ for each accumulation time interval of the AF sensor can be converted to the movement amount M(n), i.e., a mm unit, for the image forming plane.

Therefore, both the defocus amount D(n) and movement amount M(n) for the image forming plane can be expressed in terms of length along the optical axis. On the other hand, the defocus amount D(n) can be converted to a pulse number by inputting data from the shooting lens. Further, the image plane speed is calculated in terms of [mm/sec] or [pulse/sec], depending on the unit system used above. Either unit system can be used in the invention.

In FIG. 3, the position of the image at each accumulation time t(k) of the AF sensor is given as L(k), where k is an integer representing the various time measurements. The movement amount M(k) of the position for the image from time t(k −1) to time t(k) can be expressed according to Equation (12):

$$M(k)=L(k)-L(k-1) \quad (12)$$

where M (k) is approximately equal to the movement amount of the shooting lens over the period t(k−1) to t(k).

Since the defocus amount detected with the image forming position L(k) is represented as D(k), the focusing position F(k), which is detected, can be expressed according to Equation (13):

$$F(k)=L(k)+D(k) \quad (13)$$

Time changes of the focal point as a linear function are shown by Equation (14):

$$Q_r(t)=\alpha+\beta t \quad (14)$$

where α and β are constants. Thus, a regression linear function can be determined from the accumulation time t(k) of the AF sensor and focal point F(k) according to Equations (15) and (16):

$$\beta = \{\Sigma t(k) \cdot F(k) - (\Sigma t(k) \cdot \Sigma F(k))/n\}/ \quad (15)$$
$$\{\Sigma t(k)^2 - (\Sigma t(k)^2/n$$
$$= \{\Sigma t(k) \cdot F(k) -$$
$$n \cdot t_{ave} \cdot F_{ave}\}/\{\Sigma t(k)^2 - n \cdot t_{ave}^2\}$$

$$\alpha = (\Sigma F(k) - \beta \cdot \Sigma t(k))/n \quad (16)$$
$$= (\Sigma F(k) - \beta \cdot n \cdot t_{ave})/n$$
$$= F_{ave} - \beta \cdot t_{ave}$$

where $t_{ave}(n)$ is an average time of t(k); and $F_{ave}$ is an average of F(k) expressed by Equations (17) and (18), respectively.

$$t_{ave}(n)=\Sigma t(k)/n \quad (17)$$

$$F_{ave}(n)=\Sigma F(k)/n \quad (18)$$

As described above, if the focusing position is estimated using a time function $Q_r(t)$, an approximation where the movement function $Q_r(t)$ of the true image plane can be satisfactorily obtained. If errors applied to the defocus amount D(k) are large, the difference between $Q_r(t)$ and Q(t) may also be large. However, the estimation speed is much quicker than in JP016.

When considering responsiveness of an AF sensor, a regression calculation can be determined by referring to previous data in the past, such as hundreds of microseconds in the past. The number of defocus measurements over this period, when using an overlap servo, is substantially inversely proportional to a sum of accumulation times for the AF sensor plus calculation time for the defocus amount.

Figure 4:
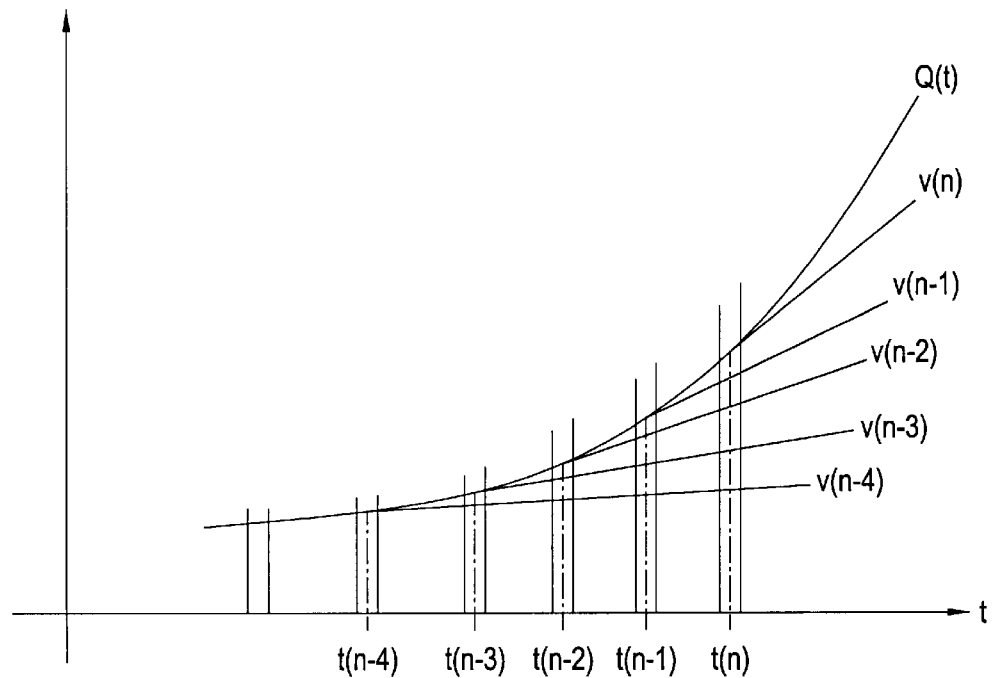
FIG. 4 is a graph representing a method for determining the acceleration of the image plane.

FIG. 4 is a graph representing a method for determining acceleration of an image plane. A time change estimation for the image plane by a linear function, described above, provides an approximation if the image plane is moving slowly. If the object is positioned near or adjacent to a camera, even if an object is moving with a constant speed, the image plane has an accelerating motion, as indicated by line Q(t) in FIG. 4.

The regression diagram or curve is not necessarily limited to a linear diagram, but can be of a high-order function that is greater than a quadratic function. Additionally, if modifications are made, an estimation or prediction is possible by using other functions. Therefore, image plane estimation by appropriate functions with a higher degree of approximation is possible.

For example, Japanese Laid Open Patent Application No. 1-107224 attempts to approximate an image plane change using a quadratic function. Regression-calculating of a prediction function for an image plane using measurement data with more than four points can be accomplished according to the quadratic function in Equation (19):

$$F(t)=\alpha+\beta t+Yt^2 \quad (19)$$

where α, β, Y are calculated based on L(k) and D(k). However, since calculation time of the CPU rapidly increases if a calculation degree is increased, a prediction using the linear diagram or curve is used according to the preferred embodiments of the invention.

Figure 5:
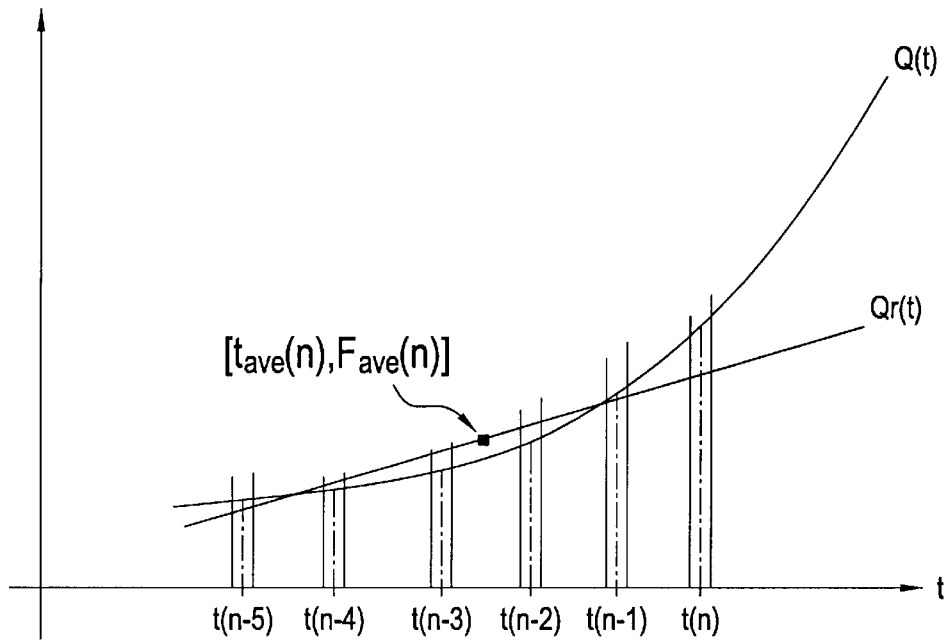
FIG. 5 is a graph representing accuracy of prediction when the image plane accelerates.

FIG. 5 is a graph representing a prediction accuracy when the image plane accelerates. As shown in FIG. 5, prediction accuracy decreases using a linear prediction that ignores the acceleration of the image plane. Equation (14) represents a regression diagram or curve for a regression that passes through averages $t^{ave}$, $F_{ave}$ for the data. The image plane speed, calculated from Equation (15), represents a speed at the average time $t_{ave}$. In other words, when an image plane is accelerating, the image plane speed determined by Equation (15) is a speed at the average time $t_{ave}$, which is after the time t(n). This is not preferred for a prediction of an image plane position after the time t(n).

From the image plane prediction diagram or curve represented by Equations (14) through (16), the prediction time is after a time t(n), when the image plane accelerates to lens drive. The image plane acceleration is calculated in accordance with this invention according to a predicted time for a lens drive to overcome the above problems.

Therefore, calculating a higher order prediction function, such as Equation (19), is a logical development to overcome known problems. However, for processing data, a substantial amount of power is required for an image plane speed history determined by Equation (15). The acceleration β of the image plane determined by Equation (15) is represented as β(n). The acceleration β of the image plane is then determined, once a history of the β(n) is checked. Thus, if β(n)−β(n−1) is greater than zero, the image plane is determined to be accelerating.

A linear diagram or curve can be determined when the lens reaches the focusing state at the next accumulation time t(n+1), if the defocus amount for accumulation in the AF sensor at time t(n) has been calculated. In order to do this, it is necessary to detect acceleration and calculate it for image plane predictions. The acceleration γ(k) at each area is determined according to Equation (20):

$$Y(n)=\{\beta(n)-\beta(n-1)\}/\{t_{ave}(n)-t_{ave}(n-1)\}$$

$$Y(n-1)=\{\beta(n-1)-\beta(n-2)\}/\{t_{ave}(n-1)-t_{ave}(n-2)\}$$

$$Y(n-2)=\{\beta(n-2)-\beta(n-3)\}/\{t_{ave}(n-2)-t_{ave}(n-3)\}/\{t_{ave}(n-2)-t_{ave}(n-3)\} \quad (20)$$

If the focusing position Q(t) is represented by a quadratic diagram or curve, acceleration values become constant. The focusing position Q(t) is not actually constant, because a diagram or curve becomes a function, such as (1/x), close to a hyperbolic curvature. However, if σ is a constant, a focusing predicted point F(n+1) at accumulation time t(n+1) can be determined according to Equation (21):

$$F(n+1)=F_{ave}(n)+\{\beta(n)+\sigma\cdot(t(n+1)-t_{ave}(n))/2\}\cdot\{t(n+1)-t_{ave}(n)\} \quad (21)$$

Figure 6:
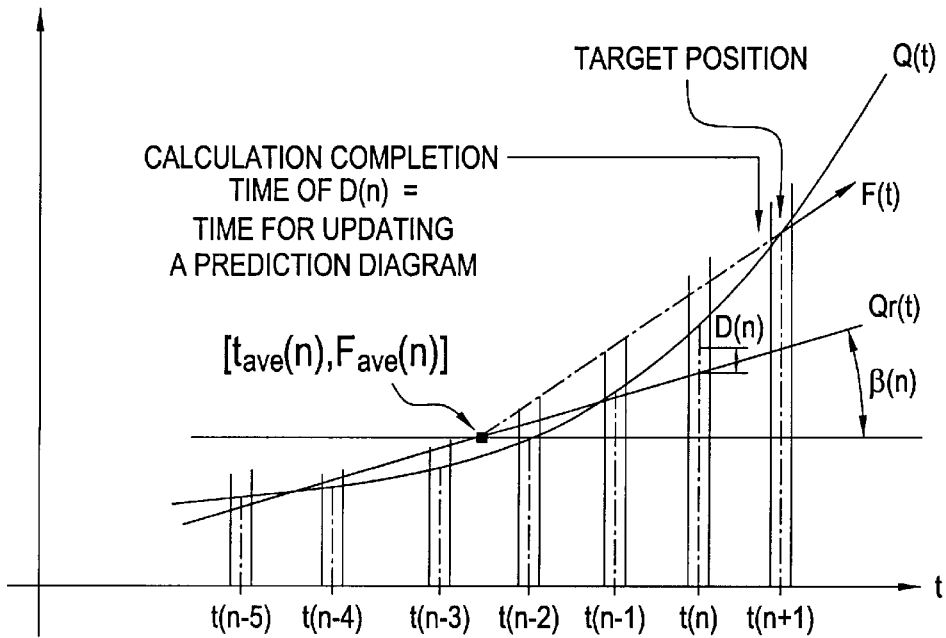
FIG. 6 is a graph of a prediction diagram, which moves at a position after time $\{t(n+1)-t(n)\}$ from a center $G[t_{ave}\ F_{ave}]$ at an average speed of $\{b(n)+s\cdot(t(n+1)-t_{ave}(n))/2\}$.

FIG. 6 is a graph representing a prediction diagram or curve that moves a time period, such as after $\{t(n+1)-t_{ave}(n)\}$, from a center $G[t_{ave}(n), F_{ave}(n)]$ at an average speed $\{b(n)+s\cdot(t(n+1)-t_{ave}(n))/2\}$. The prediction diagram or curve F(t) in FIG. 6 is represented by Equation (22):

$$F(t)=\{\beta(n)+\sigma\cdot(t(n+1)-t_{ave}(n))/2\}\cdot\{t(n+1)-t_{ave}(n)\}+F_{ave}(n) \quad (22)$$

Even though a subsequent accumulation time for the AF sensor is unknown, the time t(n+1) can be generally found from intervals spaced over prior accumulation times. For example, if $$t(n+1)-t(n)=t(n)-t(n-1) \quad (23)$$

then $$\begin{aligned} t(n+1) &= t(n)+\{t(n)-t(n-1)\} \\ &= 2\cdot t(n)-t(n-1) \end{aligned} \quad (24)$$

Alternatively, an average frequency for the AF sensor accumulation over a few prior time periods can be used.

In general, when an object is moving closer to a camera, the image plane is accelerating. However, where an acceleration history fluctuates, indicating both positive and negative acceleration, there is no reliability in the determination of the image plane acceleration. It is thus satisfactory to set an acceleration as zero, and to use a simple linear regression diagram or curve, for example as determined by Equations (14) through (16) for an image plane prediction diagram.

A linear function with a slope that considers the acceleration provides a midpoint $G[t_{ave}(n), F_{ave}(n)]$ of the data calculated in a linear regression diagram or curve and represents a prior time period and the defocus amount D(n+1) approaches zero at the subsequent accumulation time t(n+1). However, since the calculation of the defocus amount D(n) is completed immediately prior to a subsequent accumulation, even if a prediction diagram or curve is determined according to equation (21), there may not be sufficient time for a determination prior to time t(n+1), which is the target time for a proper prediction.

Therefore, even if a new prediction diagram or curve is contemplated for a lens drive, the calculation time will most likely be insufficient. Thus, there will not be sufficient time to reach a target diagram or curve at time t(n+1). Accordingly, when a lens drive control is accomplished, a new prediction diagram or curve over a calculating time for a defocus amount D(n+1), which follows the AF sensor accumulation at the time t(n+1), is shown by the bold part of F(t) in FIG. 6.

A target point for driving the shooting lens 1 or 11 is set as a focal point at time t(n+2). Updating of the prediction diagram or curve F(t) can be accomplished after the completion of the subsequent accumulation of the AF sensor.

Figure 7:
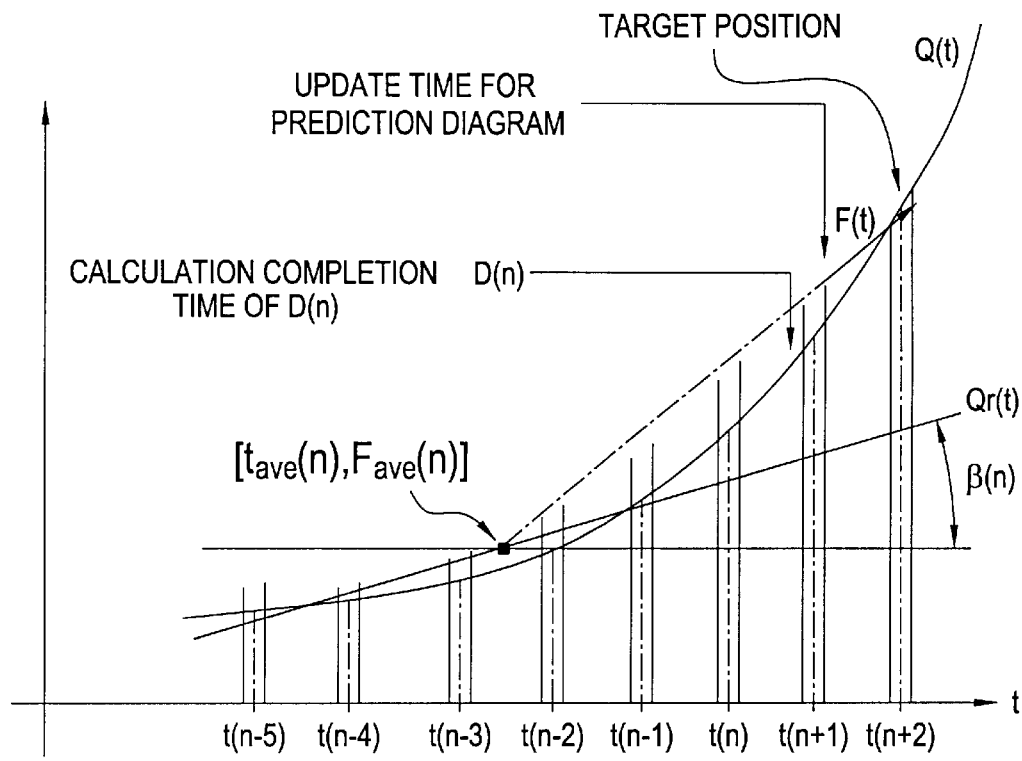
FIG. 7 is a graph of a prediction diagram.

FIG. 7 is a graph representing a prediction diagram or curve to set a focal point at time t(n+2). A detailed description of FIG. 7 is omitted since it is disclosed in Japanese Laid-Open Application No. 5-2127. Briefly, in FIG. 7, a position, according to the prediction diagram or curve, precedes the image plane position until time t(n+2), when there is time for lens drive. It is preferable to use Equation (25) to determine a prediction diagram:

$$F(t)=\{\beta(n)+\sigma\cdot(t(n+2)-t_{ave}(n))/2\}\cdot\{t-t_{ave}(n)\}+F_{ave}(n) \quad (25)$$

The above examples provide a linear diagram or curve passing through center points $G[t_{ave}(n), F_{ave}(n)]$ for data calculated for a regression as a prediction diagram or curve. The slope was determined considering the acceleration of the image plane using slope changes in past regression diagrams or curves.

Figure 8:
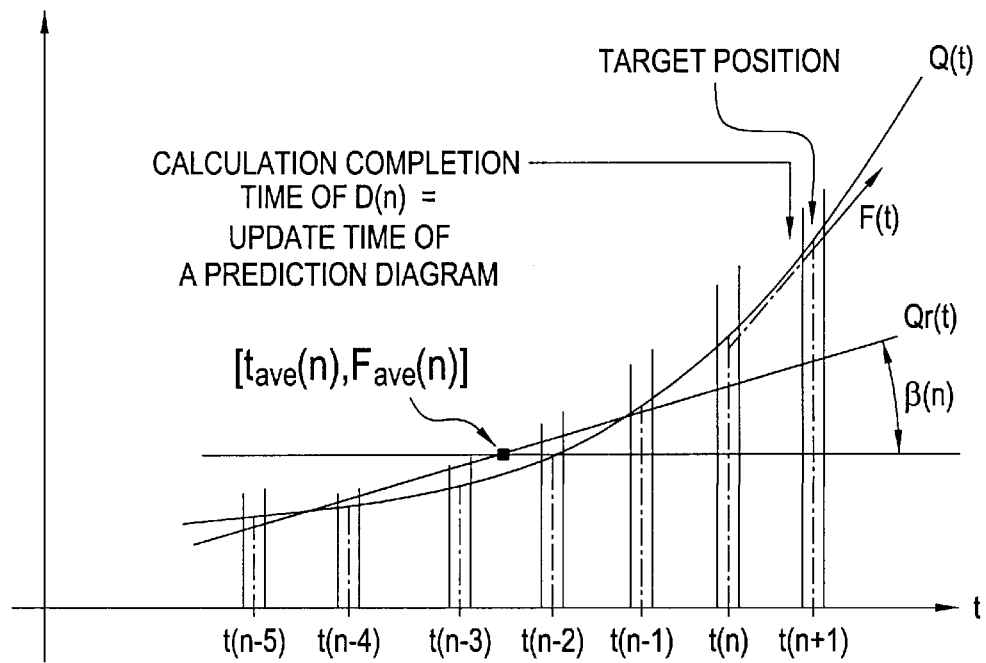
FIG. 8 is a graph representing predicting of an image plane.

FIG. 8 is a graph representing a prediction diagram or curve considering responsiveness of the determination. Therefore, even if some error amount is included in the defocus amount D(n), a diagram or curve for predicting the image plane can be determined from a linear prediction diagram or curve, which passes through the most recent focusing position, F(n)=L(n)+D(n). FIG. 8 assumes the average speed t(n) and t(n+1) as Equation (26):

$$\beta(n) + \sigma \cdot (t(n) - t_{ave}(n) + t(n+1) - t_{ave}(n))/2 = \quad (26)$$

$$\beta(n) + \sigma \cdot \{(t(n+1) + t(n))/2 - t_{ave}(n)\}$$

FIG. 8 illustrates a linear diagram or curve F(t) (Equation 27) using Equation (26) to define the slope of a line passing through point [t(n), F(n)]:

$$F(t)=F(n)+[\beta(n)+\sigma\cdot\{(t(n+1)+t(n))/2-t_{ave}(n)\}]\{t-t(n)\} \quad (27)$$

If an equation, which represents movement of an image plane, is a quadratic equation, and if point [t(n), F(n)] accurately indicates a focusing position Q(n), then F(t) and Q(t) align at time t(n+1).

Figure 9:
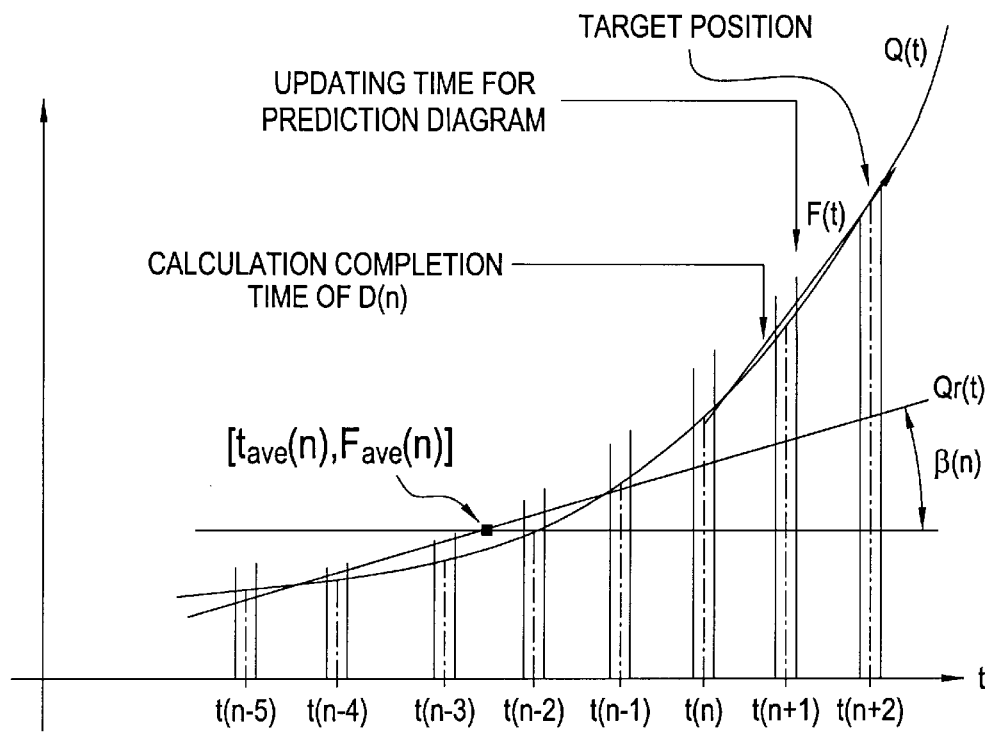
FIG. 9 is a graph representing updating the diagram or curve for predicting the image plane after an accumulation completion of a subsequent AF sensor so that focusing is achieved at accumulation time t(n+2)

FIG. 9 is a graph of a linear diagram or curve for predicting an image plane after a subsequent accumulation of the AF sensor. The lens reaches the focusing state at the next subsequent accumulation time t(n+2). FIG. 9 is substantially similar to FIG. 7. Here, the average speed of the image plane between times t(n) and t(n+1) has a slope calculated according to Equation (28):

$$\beta(n) + \sigma \cdot (t(n) - t_{ave}(n) + t(n+2) - t_{ave}(n))/2 = \quad (28)$$

$$\beta(n) + \sigma \cdot \{(t(n+2) + t(n))/2 - t_{ave}(n)\} =$$

$$\beta(n) + \sigma \cdot \{(t(n+1) - t_{ave}(n)\})$$

The linear diagram or curve passing through point [F(n), t(n)] can be represented according to Equation 29:

$$\begin{aligned} F(t) &= F(n) + [\beta(n) + \sigma \cdot \{(t(n+2) + t(n))/2 - \\ & \quad t_{ave}(n)\}] \{t - t(n)\} \\ &= F(n) + [\beta(n) + \sigma \cdot \\ & \quad \{t(n+1) - t_{ave}(n)\}] \{t - t(n)\} \end{aligned} \quad (29)$$

In FIG. 9, the prediction diagram or curve is slightly ahead of an actual focusing position, and this is similar to FIG. 7. Therefore, a prediction according to FIG. 9 is more advantageous than that in FIG. 8. Additionally, as in FIGS. 7 or 9, if updating of a diagram or curve for predicting an image plane is completed after the completion of the next sensor accumulation, the image forming plane can be determined before a focal point of the diagram or curve by setting a target position for driving at a subsequent accumulation time t(n+2) before focusing position on Q(t).

Figure 10:
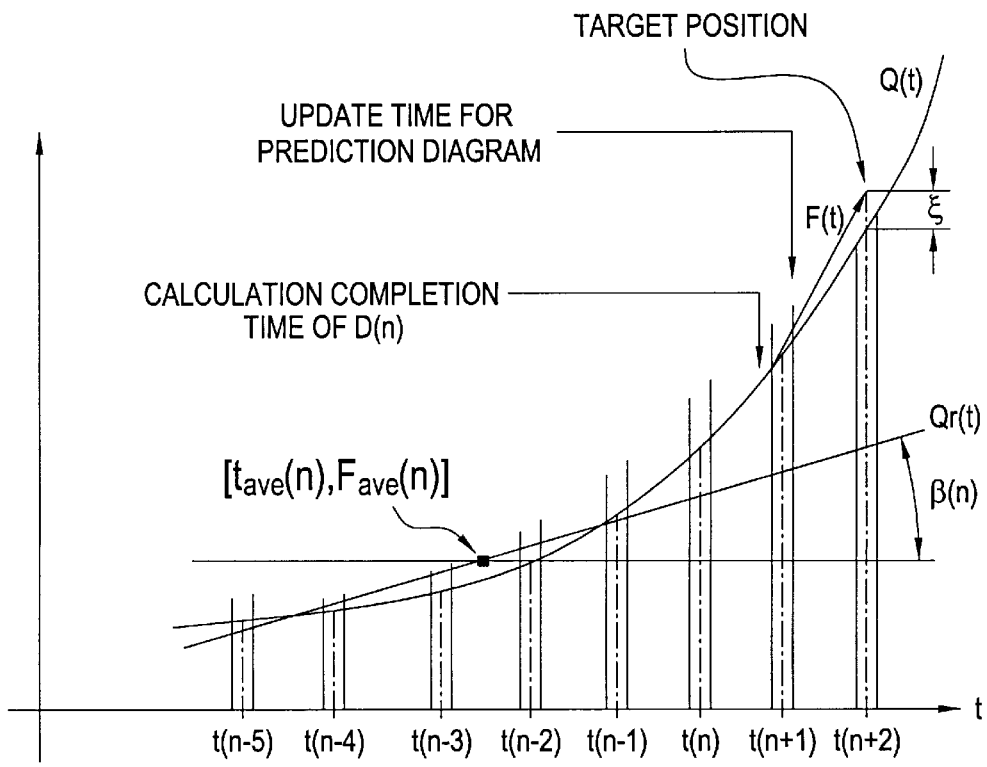
FIG. 10 is a graph representing an offset in addition to the method illustrated in FIG. 9.

FIG. 10 is a graph representing a diagram or curve with an offset, in addition to the diagram or curve of FIG. 9. In other words, FIG. 10 illustrates a situation where FIG. 9 is applied with an offset ξ to set a focal point at time t(n+2) according to Equation (30).

$$F(t) = F(n) + [\beta(n) + \sigma \cdot \{(t(n+2) + t(n))/2 - t_{ave}(n)\}] \{t - t(n)\} + \xi \quad (30)$$
$$= F(n) + [\beta(n) + \sigma \cdot \{t(n+1) - t_{ave}(n)\}] \{t - t(n)\} + \xi$$

When acceleration of the image plane is large, an offset ξ is applied. Since the lens drive amount up to an exposure time becomes small, the maximum speed and acceleration of the moving object can be increased.

Figure 11:
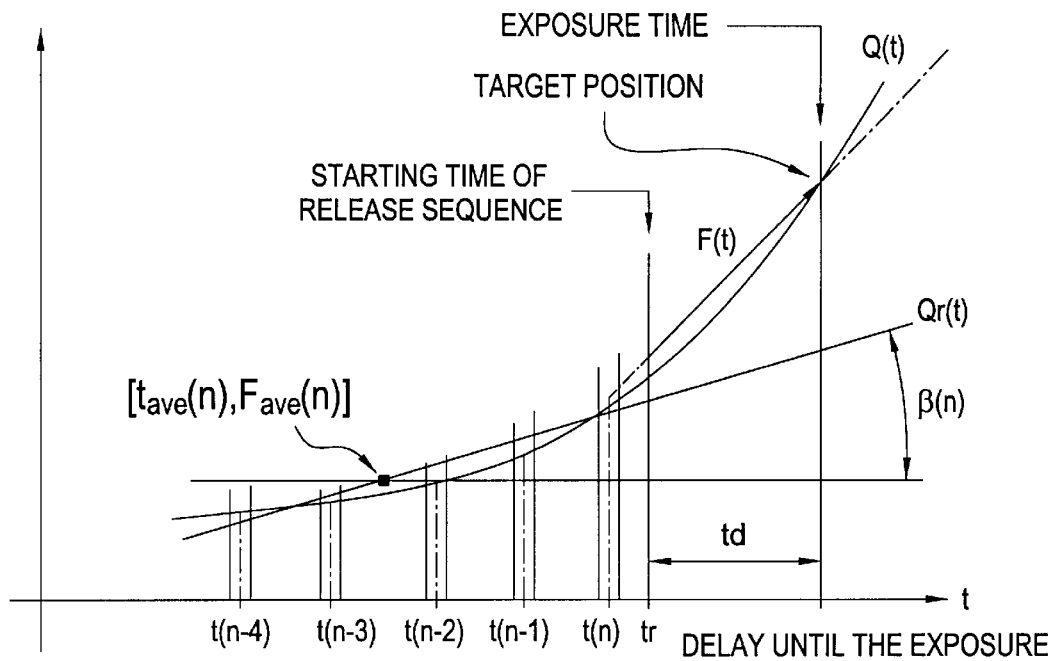
FIG. 11 is a graph representing a prediction diagram or curve used after starting the release sequence.
Figure 12:
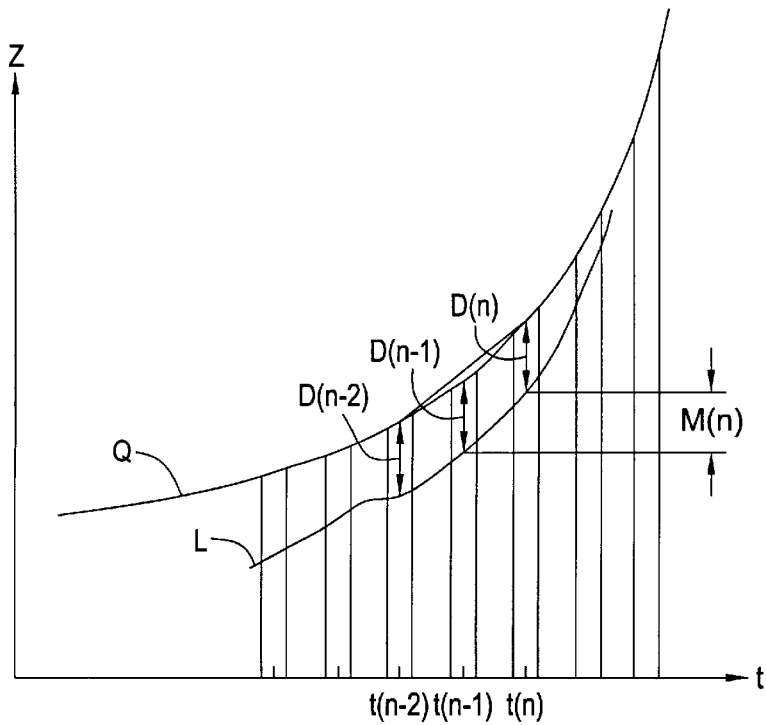
FIG. 12 is a graph representing detecting a moving speed of the image plane of the object.
Figure 13:
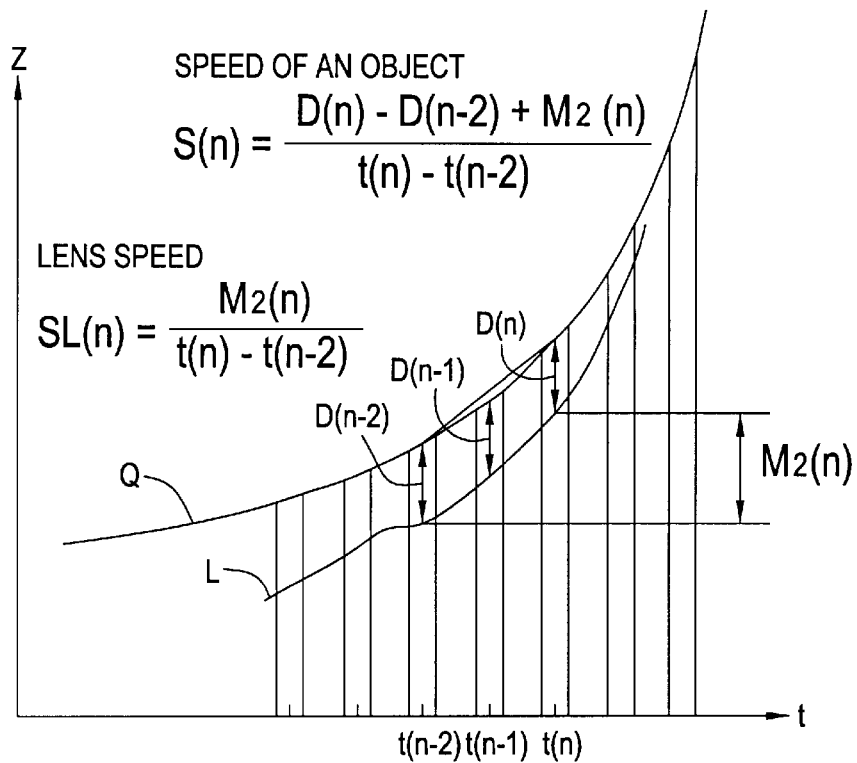
FIG. 13 is a graph representing detecting a moving speed of an image plane on the object from a defocus amount D(n−2) of two prior generations and the most recent defocus amount D(n)
Figure 14:
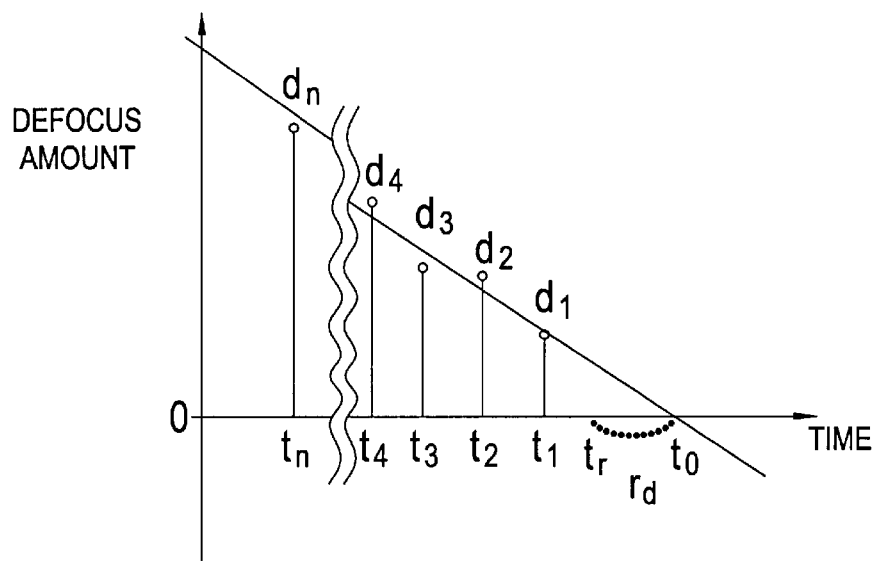
FIG. 14 is a graph representing a method to determine a linear regression diagram.
Figure 15:
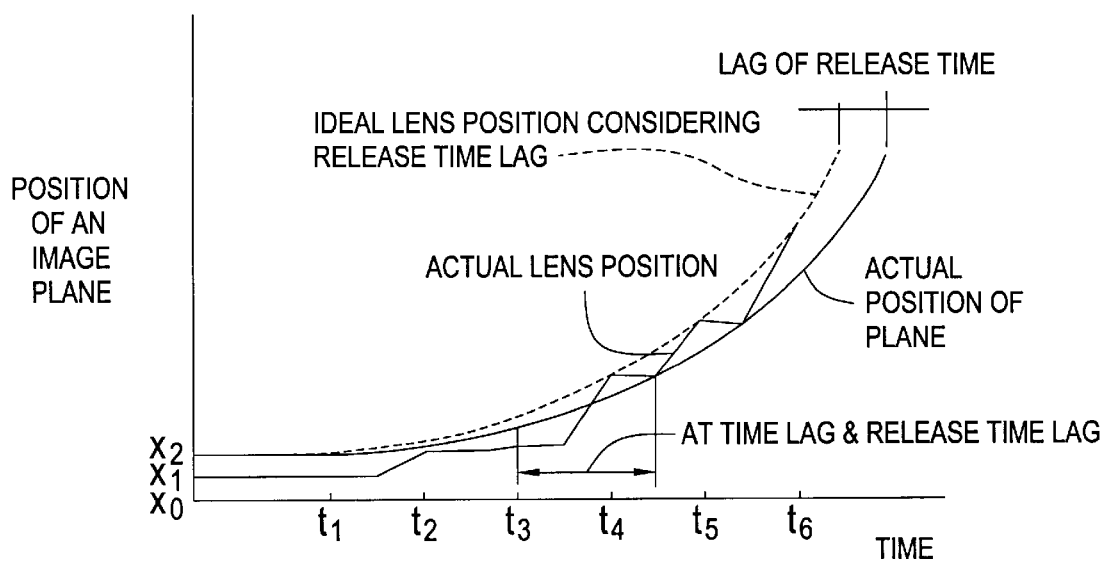
FIG. 15 is a graph representing a locus of a movement of the image forming plane predicted by a curvature.

FIG. 11 is a graph representing a prediction diagram or curve used after a commencement of a release sequence. When a photographer depresses a release button to start or commence a release sequence for photographing, a delay for controlling the diaphragm or pivoting up a main mirror of a camera usually occurs. The delay usually lasts until an actual film exposure is started.

The delay is determined by a camera mechanism particular to the individual camera. The delay is represented as td. When the release button is determined as being ON, a release sequence is initiated at time "tr", the time when the release button is depressed. A time period from the accumulation time for the AF sensor corresponding to a defocus amount D(n) calculated for the last time period, until the actual start of film exposure is represented as tr−t(n)+td.

Assuming an average speed according to Equation (31):

$$\beta(n) + \sigma \cdot \{(t(n) - t_{ave}(n)) + (tr - t_{ave}(n) + td)\}/2 = \quad (31)$$
$$\beta(n) + \sigma \cdot \{(t(n) + tr + td)/2\} - t_{ave}(n)$$

a linear diagram or curve v(t), which passes through a point F(n) of the image plane at time t(n), can be represented according to Equation (32):

$$F(t)=F(n)+[\beta(n)+\sigma\cdot\{(t(n)+tr+td)/2)-t_{ave}(n)\}]\{t-t(n)\} \quad (32)$$

Therefore, a diagram or curve that passes through a center or average G[$t_{ave}$(n), $F_{ave}$(n)] of data used to predict the image plane through a linear regression diagram or curve before the release sequence is started, and which passes through a position of the image plane at which focusing is made at the time for exposure, can be similarly calculated.

Since the film exposure is accomplished only during the closing of a shutter, the lens drive according to a prediction diagram or curve is also accomplished during this time. Thus, a diagram or curve that passes through a point [t(n), F(n)] is closer to the actual image plane speed at the start of exposure. However, the lens driving should preferably be turned OFF approximately one-twentieth or one-thirtieth of a second after the start of the exposure because constantly driving of the lens during exposure can be uncomfortable for a photographer.

Further, according to the preferred embodiments, a calculation is conducted to predict a position of the image plane at a future time based on constant image plane acceleration. However, as described above, there are many situations where the image plane moves irregularly, such as irregular acceleration or deceleration.

To correct problems associated with non-constant accelerations, a calculation of a variable speed (Y(k)−Y(k−1)) for the acceleration is performed according to Equation (20). This determines a predicted position. The predicted position is targeted, and used to determine a linear diagram or curve. However, it is often difficult to accurately detect a defocus amount D(k).

Therefore, a method that does not particularly change the above calculations corrects the accelerations (e.g. σ=Y(n)−Y(n−1)) with a coefficient g according to Equation (33):

$$\sigma_m = g \cdot \sigma \quad (33)$$

where g is approximately 1≦g≦1.5.

While this invention has been described in conjunction with specific embodiments thereof, it is evident that many alternatives, modifications and variations will be apparent to those skilled in the art. Accordingly, the preferred embodiments of the invention as set forth are intended to be illustrative, not limiting. Various changes may be made without departing from the spirit and scope of the invention as defined in the following claims.

What is claimed is:

1. An automatic focus adjustment apparatus, comprising:
   having a focusing state detector having a charge accumulating type sensor;
   a calculator that processes output data from said focusing state detector to calculate a defocus amount from a focusing position; and
   a driver that drives a shooting lens to a said focusing position in accordance with a movement prediction curve based on said the defocus amount calculated by said calculator, wherein said driver determines said movement prediction curve by a regression calculation, said regression calculation estimates said focusing position by a movement function Qr(t) of an image plane based on a plurality of past data detected during a predetermined time, said movement function Qr(t) is defined by an equation $Qr(t)=\alpha+\beta t$ where
   $\beta=\{\Sigma t(k) \cdot F(k) - n t_{ave} \cdot F_{ave}\}/\{\Sigma t(k)^2) - n t_{ave}^2\}$ and
   $\alpha=\{\Sigma D(k) - \beta \cdot n \cdot t_{ave}\}/n$, $t(k)$ being an accumulated time of a sensor, F(k) being a focusing point, $t_{ave}$ being an average time of said accumulated time of said sensor and $F_{ave}$ being an average position of said focusing point.

2. The apparatus according to claim 1, further comprising a controller that simultaneously controls the overlapping accumulation of charge in the charge accumulating type sensor while driving the shooting lens.

3. The apparatus according to claim 2, wherein said driver determines a movement prediction curve of the image plane by detecting an image plane acceleration from changes of the image plane speed, determined by each regression calculation, to predict future positions of the image plane.

4. The apparatus according to claim 3, wherein said driver determines the movement prediction curve for said image plane so the curve passes through the image plane at a most recent accumulation time and a predicted point of the image plane at a next accumulation time.

5. A method for automatic focusing, comprising:
   detecting a focusing state using a charge accumulating type sensor;
   processing output data detected from said focusing state to calculate a defocus amount from a focusing position; and driving a shooting lens to said focusing position in accordance with a movement prediction curve based on said calculated defocus amount wherein driving said shooting lens determines said movement prediction curve by a regression calculation, said regression calculation estimates said focusing position by a movement function Qr(t) of an image plane based on a plurality of past data detected during a predetermined time, said movement function Qr(t) is defined by an equation $$Qr(t) = \alpha + \beta t$$

where $$\beta = \{\Sigma t(k) \cdot F(k) - n t_{ave} \cdot F_{ave}\} / \{\Sigma t(k)^2 - n t_{ave}^2\} \text{ and}$$

$$\alpha = \{\Sigma D(k) - \beta \cdot n \cdot t_{ave}\} / n, \ t(k)$$

being an accumulated time of a sensor, F(k) being a focusing point, $t_{ave}$ being an average time of said accumulated time of said sensor and $F_{ave}$ being an average position of said focusing point.

6. The method according to claim 5 further comprising overlapping the accumulation of charge in the charge accumulating type sensor while simultaneously driving the shooting lens.

7. The method according to claim 5, further comprising determining a movement prediction curve of the image plane by detecting an image plane acceleration from changes of image plane speed, determined by each regression calculation, to predict future positions of the image plane.

8. The method according to claim 7, further comprising determining the movement prediction curve for said image plane so that the curve passes through the image plane at a most recent accumulation time and a predicted point of the image plane at a next accumulation time.

* * * * *